United States Patent [19]

Baer et al.

[11] Patent Number: 5,308,640
[45] Date of Patent: * May 3, 1994

[54] LOW GREASINESS FRENCH FRIES AND METHODS FOR PREPARING SAME

[75] Inventors: John H. Baer, Cincinnati; Stephen P. Zimmerman, Wyoming, both of Ohio; Robert A. Farrell, Covington, Ky.

[73] Assignee: The Procter & Gamble Company, Cincinnati, Ohio

[*] Notice: The portion of the term of this patent subsequent to Feb. 4, 2009 has been disclaimed.

[21] Appl. No.: 936,978

[22] Filed: Aug. 28, 1992

[51] Int. Cl.$^5$ .............................. A23L 1/29; A23L 1/217
[52] U.S. Cl. ........................................ 426/611; 426/99; 426/606; 426/607; 426/637; 426/804
[58] Field of Search ............... 426/99, 611, 606, 607, 426/804, 637

[56] References Cited

U.S. PATENT DOCUMENTS

| | | | |
|---|---|---|---|
| 3,600,186 | 8/1971 | Mattson et al. | 99/1 |
| 3,955,010 | 5/1976 | Chozianin et al. | 426/605 |
| 4,005,195 | 1/1977 | Jandacek | 424/180 |
| 4,005,196 | 1/1977 | Jandacek et al. | 424/180 |
| 4,034,083 | 7/1977 | Mattson | 424/180 |
| 5,071,669 | 12/1991 | Seiden | 426/660 |
| 5,085,884 | 2/1992 | Young et al. | 426/611 |

FOREIGN PATENT DOCUMENTS

| | | | |
|---|---|---|---|
| 233856 | 8/1987 | European Pat. Off. | A23D 5/00 |
| 236288 | 9/1987 | European Pat. Off. | A23D 5/00 |
| 287157 | 10/1988 | European Pat. Off. | A23L 1/01 |
| 350987 | 1/1990 | European Pat. Off. | A23D 9/00 |
| 350988 | 1/1990 | European Pat. Off. | A23D 9/00 |
| 443648 | 8/1991 | European Pat. Off. | A23D 9/00 |
| 91/15960 | 10/1991 | PCT Int'l Appl. | A23D 7/00 |
| 91/15963 | 10/1991 | PCT Int'l Appl. | A23D 9/00 |

Primary Examiner—Helen F. Pratt
Attorney, Agent, or Firm—Tara M. Rosnell

[57] ABSTRACT

Reduced calorie french fries and other high moisture fat-coated foods having less greasiness are disclosed. Such products are typically obtained by applying to the surface of the french fry, or other food, reduced calorie fat compositions having particular fluid viscosity characteristics that correlate to reduced greasiness impressions. These reduced calorie fat compositions comprise a nondigestible fat, and optionally, a triglyceride fat or oil. The nondigestible fat in general comprises a liquid nondigestible oil and a sufficient amount of a nondigestible solid polyol polyester to control passive oil loss typically associated with the ingestion of liquid nondigestible oils.

22 Claims, No Drawings

LOW GREASINESS FRENCH FRIES AND METHODS FOR PREPARING SAME

TECHNICAL FIELD

The present invention relates to reduced calorie french fries and other high moisture fat-coated foods having reduced greasiness. This invention further provides a method for preparing reduced calorie french fries and other high moisture fat-coated foods which are not unacceptably greasy in taste.

BACKGROUND OF THE INVENTION

Many restaurants, and in particular "fast food" restaurants, serve food such as chicken, fish, onion rings, and especially french fries, which are deep-fried in edible cooking fats or oils. Of these fried foods, french fried potatoes are particularly well liked by virtue of their textural dichotomy. This textural dichotomy manifests itself in a product which has a fairly crisp exterior and a fairly tender and moist interior. The method of deep frying has been found to be a particularly suitable way for imparting this desired textural dichotomy to french fried potatoes.

Deep frying is a process of cooking involving the direct transfer of heat from the frying medium to a cold or frozen food. In deep frying of french fried potatoes, cold or frozen uncooked or partially cooked (par-fried) french fried potatoes are typically deposited in a wire mesh basket. This basket is then immersed in a frying at or oil medium that has been heated to temperatures of approximately 335° to 400° C. (176.6° to 190.5° C.). The french fried potatoes can be immersed in this hot frying medium for varying lengths of time, typically on the order of from about 120 to about 240 seconds. While immersed, the french fried potatoes absorb a substantial quantity of the frying fat or oil, typically on the order of from about 12 to about 20% by weight of the french fried potato. Since this frying fat or oil comprises almost exclusively triglycerides, this frying procedure imparts a significant caloric content (about 9 calories per gram of oil absorbed) to french fried potatoes, as well as other foods fried in such triglyceride-based frying media.

Certain polyol fatty acid polyesters have been suggested as low calorie substitutes for these triglyceride fats and oils. For example, nonabsorbable, nondigestible sugar fatty acid esters or sugar alcohol fatty acid esters having at least 4 fatty acid ester groups with each fatty acid having from 8 to 22 carbon atoms have been used as partial fat replacers in low calorie food compositions. (See Mattson et al; U.S. Pat. No. 3,600,186; Issued Aug. 17, 1971.) Foods in which these polyol polyesters are particularly useful as partial or complete replacements for triglyceride fats or oils include products which are suitably prepared by frying.

Unfortunately, regular ingestion of moderate to high levels of nondigestible polyol polyesters which are liquid at body temperature can result in undesirable passive oil loss from the body, namely, uncontrollable leakage of such liquid polyesters through the anal sphincter. On the other hand, completely solid forms of nondigestible polyesters can have a sufficiently high solids content at body temperatures (i.e., 98.6° F., 37° C.) such that they present no anal leakage problem. However, these normally solid polyesters can taste waxy in the mouth when ingested.

As an alternative to these completely liquid or completely solid nondigestible/nonabsorbable polyol polyesters, certain intermediate melting polyol fatty acid polyesters have been developed that provide passive oil loss control, while at the same time reducing waxiness in the mouth. (See Bernhardt; European Patents 236,288 and 233,856; Published Sep. 9, 1987 and Aug. 26, 1987, respectively.) These intermediate melting polyol polyesters exhibit a unique rheology at body temperatures by virtue of their having a matrix which involves a minimal level of solids (e.g. about 12% or lower) that bind the remaining liquid portion. As a result, these intermediate melting polyol polyesters are sufficiently viscous and have a sufficiently high liquid/solid stability at body temperatures to provide passive oil loss control. An example of such intermediate melting polyol polyesters are those obtained by substantially completely esterifying sucrose with a 55:45 mixture of fully hydrogenated (hardstock) and partially hydrogenated soybean oil fatty acid methyl esters. (See Examples 1 and 2 of the above European patent publications.)

These intermediate melting polyol polyesters can be used as total or partial replacements for conventional triglyceride fats or oils in various food products, including cooking and frying oils. However, it has been found that certain foods such as french fried potatoes fried in frying fats containing substantial levels of these nondigestible intermediate melting polyol polyesters, particularly at levels in excess of about 50%, can give a significantly increased greasiness impression compared to french fried potatoes that have been fried in the digestible triglyceride fat or oil that the nondigestible polyol polyester has partially replaced. (In terms of physical characteristics, "greasiness" is, essentially, an unpleasant liquid viscosity effect, as contrasted with "waxiness" which relates to how a fat composition is sensed in the mouth and in particular relates to a sensation that the fat composition has a relatively high level of solids. In terms of organoleptic properties during french fry tasting, "greasiness" is described as a vaseline-like coating in the mouth.) However, as the proportion of triglycerides is increased relative to the intermediate melting polyesters to impart less greasiness to the french fried potatoes, the caloric content of the french fried potatoes increases accordingly.

In view of the foregoing, it would be desirable to identify reduced low calorie cooking, e.g. frying, fats containing high levels of nondigestible polyol polyesters, especially intermediate melting polyol polyesters in excess of 50% by weight, suitable for use without imparting excessive greasiness to french fried potatoes and other high moisture foods fried in such fats.

SUMMARY OF THE INVENTION

The present invention relates to high moisture cooked food products which contain a reduced calorie fat composition but which nevertheless do not impart an undesirable sensation of greasiness when consumed. Such a product comprises an edible substrate and from about 3% to about 25% by weight of the product of the reduced calorie fat composition. At least a portion of the fat composition is coated on the surface of the food product. The reduced calorie fat composition which is utilized must contain a nondigestible fat component and may optionally contain a conventional triglyceride fat or oil component as well.

In one embodiment of the food products herein, the nondigestible fat component of the reduced calorie fat composition comprises a blend of a liquid nondigestible oil having a complete melting point below about 37° C. and a nondigestible solid polyol fatty acid polyester having a complete melting point above about 37° C. The solid polyol fatty acid polyester component of this blend is present in the blend in an amount sufficient to control passive oil loss of the liquid nondigestible oil upon ingestion. The nondigestible fat component furthermore has a Solid Fat Content profile slope between 70° F. and 98.6° F. of from 0 to about −0.85% solids/°F. In this embodiment the nondigestible fat component comprises from about 10% to 100% of the reduced calorie fat composition and the triglyceride fat or oil component comprises from 0% to about 90% of the reduced calorie fat composition.

In an alternative embodiment, the nondigestible portion of the fat composition is a polyol fatty acid polyester component comprising polyols selected from sugar and sugar alcohols having from 4 to 8 hydroxyl groups, which polyols contain fatty acid ester groups having from 4 to 24 carbon atoms. This polyol polyester component furthermore has a viscosity at 38.7° C. of from about 5 to about 120 poise at a shear rate of 10 sec$^{-1}$; a liquid/solid stability at 38.7° C. of at least about 30%, and a Solid Fat Content at 37° C. of about 25% or less. In this embodiment the nondigestible polyol fatty acid polyester component comprises from about 55% to about 85% of the reduced calorie fat composition and a conventional triglyceride fat or oil component comprises from about 15% to about 45% of the reduced calorie fat composition.

In food products utilizing either type of nondigestible fat component, the reduced calorie fat composition must be formulated to have a fluid viscosity of from about 12 to about 105 centipoise at 60° C. Furthermore, the ratio of fluid viscosity of the fat composition to the percent fat in the product will typically range from about 2.5 to about 25.

The present invention also relates to a method for preparing high moisture cooked food products of reduced greasiness. Such a method comprises incorporating into an edible substrate from about 3% to about 25% of the reduced calorie fat composition having the characteristics as hereinbefore described. It has been discovered that there is a correlation between the fluid viscosity of the reduced calorie fat compositions used to prepare these high moisture food products and the greasiness impression exhibited by foods which have been coated with such fat compositions. Such a correlation is based on taste testing and provides means for imparting to high moisture, fat-coated foods the benefits of using reduced calorie fat compositions therein without also imparting an excessive level of greasiness to such products relative to similar products made with all-triglyceride fat materials.

DETAILED DESCRIPTION OF THE INVENTION

A. Definitions

By "nondigestible" is meant that only about 70% or less of a fat or il so characterized is digested by the body. Preferably, only about 20% or less of such fats or oils are digested.

By "digestible triglyceride fat or oil" is meant a triglyceride fat or oil that is substantially completely digested by the body. Typically, at least about 90% of such triglyceride fats or oils are digested.

By "polyol" is meant a polyhydric alcohol containing at least 4, preferably from 4 to 11, more preferably from 4 to 8, most preferably from 6 to 8, hydroxyl groups. Polyols thus include sugars (i.e., monosaccharides, disaccharides, and trisaccharides), sugar alcohols (i.e., the reduction product of sugars wherein the aldehyde or ketone group has been reduced to an alcohol), other sugar derivatives (i.e., alkyl glucosides), polyglycerols such as diglycerol and triglycerol, pentaerythritol and polyvinyl alcohols. Specific examples of suitable sugars, sugar alcohols and sugar derivatives include xylose, arabinose, ribose, xylitol, erythritol, glucose, methyl glucoside, mannose, galactose, fructose, sorbitol, maltose, lactose, sucrose, raffinose, and maltotriose. Preferred polyols include erythritol, xylitol, sorbitol, and glucose, with sucrose being an especially preferred polyol.

By "polyol fatty acid polyester" is meant a polyol as hereinbefore defined having at least 4 fatty acid ester groups, i.e., at least 4 of the hydroxyl groups are esterified with fatty acids. Polyol fatty acid esters that contain 3 or less fatty acid ester groups are generally digested in, and the products of digestion are absorbed from, the intestinal tract much in the manner of ordinary triglyceride fats or oils, whereas those polyol fatty acid esters containing 4 or more fatty acid ester groups are substantially nondigestible and consequently nonabsorbable by the human body. It is not necessary that all of the hydroxyl groups of the polyol be esterified, but it is preferable that disaccharide molecules contain no more than 3 unesterified hydroxyl groups, and more preferably no more than 2 unesterified hydroxyl groups, for the purpose of being nondigestible. Typically, substantially all (e.g., at least about 85%, preferably at least about 95%) of the hydroxyl groups of the polyol are esterified. In the case of sucrose polyesters, typically from about 7 to 8 of the hydroxyl groups of the polyol are esterified.

By "fatty acid ester group" is meant a moiety formed from the reaction of a hydroxyl group with a fatty acid or fatty acid derivative which which forms an ester that has fat-like properties. The fatty acid radicals typically contain fatty acid radicals typically having at least 4 carbon atoms, typically at least 8 carbon atoms, more typically at least 12 carbon atoms, most typically at least 16 carbon atoms. Representative examples of such fatty acid radicals include acetic, propionic, butyric, caprylic, capric, lauric, myristic, myristoleic, palmitic, palmitoleic, stearic, oleic, elaidic, ricinoleic, linoleic, linolenic, eleostearic, arachidic, arachidonic, behenic, lignoceric, erucic, and cerotic fatty acids radicals. These fatty acid radicals can be derived from naturally occurring or synthetic fatty acids. The fatty acid radicals can be saturated or unsaturated, including positional or geometric isomers, e.g., cis- or trans- isomers, and can be the same for all ester groups, or can be mixtures of different fatty acids.

As used herein "cooking" or "cooked" refers to a procedure wherein food products are treated with heat prior to their consumption, such as, for example, by frying, baking, broiling, microwaving, etc. Typically, cooking entails reducing the moisture content of the uncooked food.

As used herein, the term "comprising" means various components or steps can be conjointly employed in the compositions, foods, and methods of the present invention. Accordingly, the term "comprising" encompasses the more restrictive terms "consisting essentially of" and "consisting of".

All percentages and proportions used herein are by weight unless otherwise specified.

B. Reduced Calorie Fat Compositions

As indicated, the food products of the present invention are prepared by incorporating thereinto certain amounts of a reduced calorie fat composition. Such fat compositions essentially comprise from about 10% to 100% of a non-digestible fat component. These reduced calorie fat compositions can also optionally contain up to about 90% of a conventional triglyceride oil or fat component. These reduced calorie fat compositions also have certain specific rheological characteristics as hereinafter more fully described.

1. Nondigestible Fat Component

The reduced calorie fat compositions used herein must contain a nondigestible fat component which can be one of two alternative types. One suitable type of nondigestible fat component comprises a blend of a liquid nondigestible oil and a solid nondigestible polyol fatty acid polyester. Such a blend should have a relatively flat Solid Fat Content (SFC) profile slope across the range of temperatures between room temperature and body temperature. Another suitable type of nondigestible fat component for use in the reduced calorie fat compositions herein comprises certain selected "intermediate melting" polyol polyester mixtures which have certain viscosity characteristics and which exhibit a particularly defined SFC characteristics between room and body temperature. Both of these non-digestible fat component types are described in greater detail as follows:

a) Liquid/Solid Blends i) Nondigestible Liquid Oil

A key component of the liquid/solid blend type of nondigestible fat component is a liquid nondigestible oil having a complete melting point above about 37° C. Suitable liquid nondigestible edible oils for use herein include liquid polyol fatty acid polyesters (see Jandacek; U.S. Pat. No. 4,005,195; Issued Jan. 25, 1977); liquid esters of tricarballylic acids (see Hamm; U.S. Pat. No. 4,508,746; Issued Apr. 2, 1985); liquid diesters of dicarboxylic acids such as derivatives of malonic and succinic acid (see Fulcher; U.S. Pat. No. 4,582,927; Issued Apr. 15, 1986); liquid triglycerides of alpha-branched chain carboxylic acids (see Whyte; U.S. Pat. No. 3,579,548; Issued May 18, 1971); liquid ethers and ether esters containing the neopentyl moiety (see Minich; U.S. Pat. No. 2,962,419; Issued Nov. 29, 1960); liquid fatty polyethers of polyglycerol (See Hunter et al; U.S. Pat. No. 3,932,532; Issued Jan. 13, 1976); liquid alkyl glycoside fatty acid polyesters (see Meyer et al; U.S. Pat. No. 4,840,815; Issued Jun. 20, 1989); liquid polyesters of two ether linked hydroxypolycarboxylic acids (e.g., citric or isocitric acid) (see Huhn et al; U.S. Pat. No. 4,888,195; Issued Dec. 19, 1988); liquid esters of epoxide-extended polyols (see White et al; U.S. Pat. No. 4,861,613; Issued Aug. 29, 1989); all of which are incorporated herein by reference, as well as liquid polydimethyl siloxanes (e.g., Fluid Silicones available from Dow Corning).

Preferred liquid nondigestible oils are the liquid polyol fatty acid polyesters that comprise liquid sugar fatty acid polyesters, liquid sugar alcohol fatty acid polyesters, and mixtures thereof. The preferred sugars and sugar alcohols for preparing these liquid polyol polyesters include erythritol, xylitol, sorbitol, and glucose, with sucrose being especially preferred. The sugar or sugar alcohol starting materials for these liquid polyol polyesters are preferably esterified with fatty acids containing from 8 to 22 carbon atoms, and most preferably from 12 to 18 carbon atoms. Suitable naturally occurring sources of such fatty acids include corn oil fatty acids, cottonseed oil fatty acids, peanut oil fatty acids, soybean oil fatty acids, canola oil fatty acids (i.e. fatty acids derived from low erucic acid rapeseed oil), sunflower seed oil fatty acids, sesame seed oil fatty acids, safflower oil fatty acids, palm kernel oil fatty acids, and coconut oil fatty acids.

The polyol fatty acid polyesters that are liquid have minimal or no solids at a temperature of 98.6° F. (37° C.), i.e., body temperatures. These liquid polyol polyesters typically contain fatty acid ester groups having a high proportion of $C_{12}$ or lower fatty acid groups or else a high proportion of $C_{18}$ or higher unsaturated fatty acid groups. In the case of those liquid polyol polyesters having high proportions of unsaturated $C_{18}$ or higher fatty acid groups, at least about half of the fatty acids incorporated into the polyester molecule are typically unsaturated. Preferred unsaturated fatty acids in such liquid polyol polyesters are oleic acid, linoleic acid, and mixtures thereof. The following are nonlimiting examples of specific liquid polyol polyesters suitable for use in the present invention: sucrose tetraoleate, sucrose pentaoleate, sucrose hexaoleate, sucrose heptaoleate, sucrose octaoleate, sucrose hepta- and octaesters of unsaturated soybean oil fatty acids, canola oil fatty acids, cottonseed oil fatty acids, corn oil fatty acids, peanut oil fatty acids, palm kernel oil fatty acids, or coconut oil fatty acids, glucose tetraoleate, the glucose tetraesters of coconut oil or unsaturated soybean oil fatty acids, the mannose tetraesters of mixed soybean oil fatty acids, the galactose tetraesters of oleic acid, the arabinose tetraesters of linoleic acid, xylose tetralinoleate, galactose pentaoleate, sorbitol tetraoleate, the sorbitol hexaesters of unsaturated soybean oil fatty acids, xylitol pentaoleate, and mixtures thereof.

The liquid polyol fatty acid polyesters suitable for use in the liquid/solid blend type of nondigestible fat component can be prepared by a variety of methods known to those skilled in the art. These methods include: transesterification of the polyol (i.e. sugar or sugar alcohol) with methyl, ethyl or glycerol fatty acid esters using a variety of catalysts; acylation of the polyol with a fatty acid chloride; acylation of the polyol with a fatty acid anhydride; and acylation of the polyol with a fatty acid, per se. See, for example, U.S. Pat. Nos. 2,831,854, 3,600,186, 3,963,699, 4,517,360 and 4,518,772, all of which are incorporated by reference, which disclose suitable methods for preparing polyol fatty acid polyesters. Specific, but nonlimiting, examples of the preparation of liquid polyol polyesters suitable for use in the practice of the present invention are disclosed in Young et al; World Patent Application US91-02394 (publication number W091-15964); published Oct. 31, 1991, which is incorporated by reference.

ii) Solid Polyol Fatty Acid Polyesters

Another key component of the liquid/solid blend type of nondigestible fat component comprises polyol fatty acid polyesters that are solid at temperatures of about 37° C. and higher, and preferably are solid ate temperatures of about 50° C., and higher, and most preferably at temperatures of about 60° C. or higher. These solid polyol polyesters have the ability to bind high levels of edible liquid nondigestible oils, such as liquid polyol polyesters previously described, when included in appropriate amounts. This capacity to bind liquid nondigestible oils enables these solid polyol polyesters to control or prevent the passive oil loss problem associated with the ingestion of such liquid oils.

Preferred solid polyol fatty acid polyesters of this type are selected from solid sugar fatty acid polyesters, solid sugar alcohol fatty acid polyesters and mixtures thereof. The preferred sugars and sugar alcohols include those previously defined for the liquid polyol polyesters, with sucrose being especially preferred.

x) Diversely Esterified Polyol Polyesters

One class of suitable solid polyol polyesters for use in the liquid/solid blend are those wherein the esters groups comprise a combination of (a) $C_{12}$ or higher unsaturated fatty acid radicals, $C_4$–$C_{12}$ fatty acid radicals or mixtures thereof, and (b) at least about 15% $C_{20}$ or higher saturated fatty acid radicals, preferably at least about 30%, more preferably at least about 50%, most preferably at least about 80%, long chain saturated fatty acid radicals.

Suitable unsaturated fatty acid radicals contain at least 12, preferably from 12 to 26, more preferably from 18 to 22, most preferably 18, carbon atoms. Suitable short chain saturated fatty acid radicals contain from 4 to 12, preferably from 6 to 12, and most preferably from 8 to 12, carbon atoms. Suitable long chain saturated fatty acid radicals contain at least 20, preferably from 20 to 26, most preferably 22, carbon atoms. The long chain unsaturated fatty acid radicals can be used singly or in mixtures with each other, in all proportions, as is also the case with the short chain and long chain saturated fatty acid radicals. In addition, straight chain (i.e. normal) fatty acid radicals are typical for the short chain and long chain saturated fatty acid radicals, as well as the long chain unsaturated fatty acid radicals. Examples of suitable long chain unsaturated fatty acid radicals for use in these solid polyol polyesters are monounsaturated radicals such as lauroleate, myristoleate, palmitoleate, oleate, elaidate, and erucate, and polyunsaturated radicals such as linoleate, arachidonate, linoleate, eicosapentaenoate, and docosahexaenoate. In terms of oxidative stability, the monounsaturated and diunsaturated fatty acid radicals are preferred. Examples of suitable short chain saturated fatty acid radicals are acetate, butyrate, hexanoate (caproate), octanoate (caprylate), decanoate (caprate), and dodecanoate (laurate). Examples of suitable long chain saturated fatty acid radicals are eicosanoate (arachidate), docosanoate (behenate), tetracosanoate (lignocerate), and hexacosanoate (cerotate).

Mixed fatty acid radicals from oils which contain substantial amounts of the desired long chain unsaturated fatty acids, short chain saturated fatty acids, or long chain saturated fatty acids can be used as sources of fatty acid radicals in preparing the solid polyol polyesters useful in the liquid/solid blend type of nondigestible fat component. The mixed fatty acids from such oils should preferably contain at least about 30% (more preferably at least about 50%, most preferably at least about 80%) of the desired long chain unsaturated, short chain saturated or long chain saturated fatty acids. For example, palm kernel oil fatty acids can be used instead of a mixture of the respective pure saturated fatty acids having from 8 to 12 carbon atoms. Similarly, rapeseed oil fatty acids or soybean oil fatty acids can be used instead of a mixture of the respective pure monounsaturated and polyunsaturated fatty acids having 12 to 26 carbon atoms, and hardened (i.e., hydrogenated) high erucic rapeseed oil fatty acids can be used in place of a mixture of the respective pure long chain saturated fatty acids having from 20 to 26 carbon atoms. Preferably, the $C_{20}$ or higher saturated fatty acids (or their derivatives, e.g. methyl esters) are concentrated, for example, by distillation. An example of source oils for these solid polyol polyesters are high oleic sunflower oil and substantially completely hydrogenated high erucic rapeseed oil. When sucrose is substantially completely esterified with a 1:3 by weight blend of the methyl esters of these two oils, the resulting polyester has a molar ratio of unsaturated $C_{10}$ acid radicals to saturated $C_{20}$ or higher acid radicals of about 1:1, the saturated $C_{20}$ and $C_{22}$ acid radicals being about 28.6% of the total fatty acid radicals. The higher the proportion of the desired long chain unsaturated/short chain saturated and long chain saturated fatty acids in the source oils used in making the solid polyol polyesters, the more efficient the polyesters will be in their ability to bind the liquid nondigestible oils.

The molar ratio of (a) long chain unsaturated fatty acid radicals or short chain fatty acid radicals or mixtures thereof, to (b) long chain saturated fatty acid radicals, is from about 1:15 to about 1:1. Preferably, this molar ratio of (a) to (b) radicals is from about 1:7 to about 4:4, most preferably from about 1:7 to about 3:5.

Examples of solid polyol fatty acid polyesters containing mixtures of (a) and (b) radicals include sucrose tetrabehenate tetracaprylate, sucrose pentabehenate trilaurate, sucrose hexabehenate dicaprylate, sucrose hexabehenate dilaurate, the sorbitol hexaester of palmitoleic and arachidic fatty acid radicals in a 1:2 molar ratio, the raffinose octaester of linoleic and behenic fatty acid radicals in a 1:3 molar ratio, the maltose heptaester of a mixture of sunflower oil and lignoceric fatty acid radicals in a 3:4 molar ratio, the sucrose octaester of oleic and behenic fatty acid radicals in a 2:6 molar ratio, the sucrose octaester of lauric, linoleic and behenic fatty acid radicals in a 1:3:4 molar ratio, and the sucrose hepta- and octaesters of $C_{18}$ mono- and/or diunsaturated fatty acid radicals and behenic fatty acid radicals in a molar ratio of unsaturated:behenic acid radicals of about 1:7 to 3:5.

y) Polyol Polyester Hardstocks

Another suitable class of solid polyol polyesters are those described herein as "hardstocks". Such polyol polyester hardstocks are those that contain ester groups which consist essentially of $C_{14}$-$C_{18}$ saturated fatty acid radicals. The $C_{14}$-$C_{18}$ saturated fatty acid radicals can be used singly or in mixtures with each other. In addition, straight chain (i.e. normal) fatty acid radicals are typical for the $C_{14}$-$C_{18}$ saturated fatty acid radicals. Mixed fatty acid radicals from completely or substantially completely hydrogenated vegetable oils which contain substantial amounts of the desired saturated fatty acids can be used as sources of fatty acid radicals in preparing the solid polyol polyesters useful in the present invention. The mixed fatty acids from such oils should preferably contain at least about 30% (more preferably at least about 50%, most preferably at least about 80%) of the desired saturated fatty acids. Suitable source oils include completely or substantially completely hydrogenated soybean oil, cottonseed oil, palm oil, peanut oil, corn oil, safflower oil, sunflower oil, sesame oil, low erucic acid rapeseed oil (i.e. canola oil), and high erucic acid rapeseed oil. These oils are typically hydrogenated to an Iodine Value of about 12 or less, and preferably to an Iodine Value of about 8 or less.

z) Solid Polyol Fatty Acid Polyester Preparation

These solid polyol polyesters can be made according to prior known methods for preparing polyol polyesters. Since the sucrose polyesters are the preferred solid polyol polyesters for use in the present invention, such preparation will be exemplified primarily by these materials. One such method of preparation is by reacting the acid chlorides or acid anhydrides of the respective fatty acids with sucrose, preferably using a sequential esterification process when sucrose polyesters of mixed (a) and (b) radicals are being prepared. In this sequential esterification process, sucrose is initially partially esterified with the (a) long chain unsaturated/short chain saturated acid chlorides, followed by complete or substantially complete esterification of this initial reaction product with the (b) long chain saturated fatty acid chlorides, in that order, or in the reverse order. See U.S. application Ser. No. 417,990, to James C. Letton, filed Oct. 6, 1989 (herein incorporated by reference), which discloses this sequential esterification process.

Another method for preparing these solid polyol polyesters is by the process of reacting the methyl esters of the respective fatty acids with sucrose in the presence of a fatty acid soap and a basic catalyst such as potassium carbonate. See, for example, Rizzi et al; U.S. Pat. No. 3,963,699; Issued Jun. 15, 1976, Volpenhein; U.S. Pat. No. 4,518,772; Issued May 21, 1985, and Volpenhein; U.S. Pat. No. 4,517,360; Issued May 14, 1985, all of which are incorporated by reference. See also Young et al.; World Patent Application US91-02394 (publication number WO91-15964); Published Oct. 31, 1991, which is herein incorporated by reference.

iii) Formulation of Liquid/Solid Blends

The liquid/solid blend type of nondigestible fat component can be formulated by blending together the liquid nondigestible oil and a sufficient amount of the solid polyol polyester to control or prevent passive oil loss. What constitutes a "sufficient amount to control or prevent passive oil loss" with regard to the solid polyol polyester depends upon the particular solid polyol polyester involved, the particular passive oil loss control benefits desired, and the particular greasiness impressions desired for the nondigestible fat component.

For diversely esterified solid polyol polyesters having the mixed types of ester groups as hereinbefore described, the nondigestible fat component used in the present invention usually comprises from about 80 to about 99% liquid nondigestible oil and from about 1 to about 20% solid polyol polyester. Preferably such blends comprise from about 85 to about 99% liquid nondigestible oil and from about 1 to about 15% solid polyol polyesters. More preferably such blends comprise from about 91 to about 99% liquid nondigestible oil and from about 1% to about 9% solid polyol polyester.

For solid polyol polyesters having ester groups consisting essentially of $C_{14}$–$C_{18}$ saturated fatty acid radicals, i.e. polyol polyester hardstocks, the nondigestible fat component usually comprises from about 60 to about 90% liquid nondigestible oil and from about 10 to about 40% solid polyol polyester. Preferably such blends comprise from about 70 to about 90% liquid nondigestible oil and from about 10 to about 30% solid polyol polyester. Most preferably such blends comprise from about 75 to about 85% liquid nondigestible oil and from about 15 to about 25% solid polyol polyester. Inclusion of higher levels of liquid nondigestible oil (i.e., lower levels of solid polyol polyester) can be desirable from the standpoint of reducing waxiness, but higher levels of solid polyol polyester (i.e., lower levels of liquid nondigestible oil) are desirable from the standpoint of controlling or preventing passive oil loss associated with the ingestion of such liquid oils.

The nondigestible fat components in the form of liquid/solid blends as discussed hereinabove should exhibit relatively flat SFC profile slopes across the range of temperature range of from typical room temperature to body temperature, i.e., from 70° F. to 98.6° F. Typically, the SFC profile slope between these temperatures is from 0 to −0.75% solids/°F., preferably from 0 to −0.5% solids/°F., more preferably from 0 to −0.3% solids/°F., and most preferably from 0 to −0.1% solids/°F. The liquid/solid stability of these liquid/solid blends is typically at least about 30%, preferably at least about 50%, more preferably at least about 60%, and most preferably at least about 70%.

b) Intermediate Melting Nondigestible Fat Components

Nondigestible fat components can also be formulated other than by blending together liquid nondigestible oils and solid polyol polyesters. One suitable nondigestible fat component having both liquid and solid polyol polyester species therein in a nondigestible polyol fatty acid polyester mixture comprising polyols selected from the group consisting of sugars and sugar alcohols having from 4 to 8 hydroxyl groups, with fatty acid ester groups having from 4 to 24 carbon atoms. Such polyol polyester mixtures further have, at 100° F. (37.8° C.), a viscosity of from about 5 to about 120 poise at a shear rate of $10^{-1}$ seconds, preferably from about 10 to about 75 poise, most preferably from about 15 to about 30 poise, and a liquid/solid stability (as hereinafter defined in the Analytical Methods section) of at least about 30%, preferably at least about 50%, more preferably at least about 60%, most preferably at least about 70%. These intermediate melting polyol polyesters have a high liquid/solid stability inasmuch as the liquid portion of these polyol polyester mixtures does not readily separate from the solid portion, i.e., the intermediate melting polyol polyester mixtures appear to be solid even though up to 95% or more of the polyester species therein are liquid.

Moreover, these intermediate melting polyol polyesters are sufficiently viscous and stable even at relatively low levels of solids. Solid Fat Content (SFC) provides a reasonable approximation of the percent by weight solids of a particular fatty material at a given temperature. These intermediate melting polyol polyesters desirably have an SFC at 98.6° F. (37° C.) of about 25% or less. Particularly preferred SFC values at 98.6° F. (37° C.) are in the range of from about 4 to about 18% and most preferably in the range of from about 4 to about 10%.

In preparing these intermediate melting polyol polyesters, a polyol (e.g., sucrose) is preferably esterified with mixtures of fatty acids having from 8 to 22 carbon atoms. Most preferably, at least about 70% of the fatty acids are selected from the group consisting of lauric, myristic, palmitic, stearic, oleic, and elaidic ($C_{18:1}$), linoleic ($C_{18:2}$), and behenic acids and mixtures thereof.

Iodine Value is a measure of the degree of unsaturation of fatty acids that are esterified on the polyol. These intermediate melting polyol polyesters will generally have an Iodine Value of from about 10 to about 70. A preferred group of the polyesters have an Iodine Value of from about 15 to about 60. The preferred polyesters also have a fatty acid composition characterized by: (a) not more than about 0.6% fatty acids having 3 or more double bonds; (b) not more than about 20% fatty acids having 2 or more double bonds; and (c) not more than about 35% of the fatty acid double bonds are trans-double bonds. the percent trans-double bonds is calculated as follows:

$$P = \frac{D_{trans}}{D_{total}} \times 100\%$$

where
P = percent trans-double bonds
$D_{trans}$ = trans fatty acid (by IR)
$D_{total}$ = total number of double bonds Preferred fatty acid compositions for these intermediate melting polyesters are:
less than about 12% palmitic acid;
from about 30 to about 70% stearic acid;
from about 15 to about 60% oleic and elaidic ($C_{18:1}$) acids;
less than about 12% linoleic ($C_{12:2}$) acid; and
less than about 0.6% linolenic ($C_{18:3}$) acid.

Most preferred fatty acid compositions for these preferred intermediate melting polyesters are:
less than about 12% palmitic acid;
from about 40 to about 70% stearic acid; from about 20 to about 50% oleic and elaidic ($C_{18:3}$) acids; less than about 12% linoleic ($C_{18:3}$) acid; and less than about 0.6% linolenic ($C_{18:3}$) acid.

Highly preferred intermediate melting polyol polyesters are sucrose fatty acid polyesters. Preferred sucrose fatty acid polyesters have the majority of their hydroxyl groups esterified with fatty acids. Preferably at least about 85%, and most preferably at least about 95%, of the esters are octaesters, heptaesters, hexaesters, or mixtures thereof. Preferably, no more than about 40% of the esters are hexaesters or heptaesters, and at least about 60% of the esters are octaesters. Most preferably at least about 70% of the esters are octaesters. It is also most preferred that the polyesters have a total content of penta- and lower esters of not more than 3%.

These intermediate melting polyol polyesters can be prepared by a variety of methods well known to those skilled in the art. These methods include: transesterification of the polyol with methyl, ethyl, or glycerol fatty acid esters using a variety of catalysts; acylation of the polyol with a fatty acid chloride; acylation of the polyol with a fatty acid anhydride; and acylation of the polyol with a fatty acid, per se. See, for example, the preparation of intermediate melting sucrose polyesters according to Examples 1 and 2 of European Patent Applications 233,856 and 236,288, to Bernhardt, published August 26 and Sep. 9, 1987.

Preferred intermediate melting polyol polyesters described above having maximum levels of fatty acids with two or more double bonds, as well as trans-double bonds, can be prepared using two or three source oil streams. See U.S. application Ser. No. 421,867, to Robert W. Johnston, Josephine L. Kong-Chan, Richard G. Schafermeyer and Paul Seiden, filed Oct. 16, 1989 (herein incorporated by reference), which discloses these preferred intermediate melting polyol polyesters and their preparation.

2. Conventional Triglyceride Oil or Fat Component

In addition to the nondigestible fat component, the fat compositions used in the present invention can optionally include a conventional digestible triglyceride fat or oil. In the case where the nondigestible fat component comprises intermediate melting polyol polyesters, inclusion of the digestible triglyceride fat or oil is in fact required to provide fat compositions having the requisite fluid viscosity characteristics as discussed in greater detail hereinafter.

As used herein, the term "triglyceride oil" refers to those triglyceride compositions which are fluid or liquid above about 25° C. Although not a requirement, the triglyceride oils useful in the present invention can include those which are fluid or liquid below 25° C. These triglyceride oils consist primarily of triglyceride materials, but can also include residual levels of other components such as mono- and diglycerides. To remain fluid or liquid at temperatures below 25° C., the triglyceride oil contains a minimal amount of glycerides having melting points higher than about 25° C. so as to limit the solids increase when the triglyceride oil is cooled. It is desirable that the triglyceride oil be chemically stable and resistant to oxidation.

Suitable triglyceride oils can be derived from naturally occurring liquid vegetable oils such as cottonseed oil, soybean oil, safflower oil, corn oil, olive oil, coconut oil, palm kernel oil, peanut oil, rapeseed oil, canola oil (i.e., rapeseed oil low in erucic acid), sesame seed oil, sunflower seed oil, and mixtures thereof. Also suitable are liquid oil fractions obtained from palm oil, lard and tallow by, for example, graining or directed interesterification, followed by separation of the oils. Oils predominating in glycerides of unsaturated acids can need some hydrogenation to maintain flavor, but care should be taken not to greatly increase the amount of glycerides melting above 25° C. When oils are selected which have a larger amount of solids melting between 25° and 40° C. than are desirable, it can be necessary to separate out the solids. For example, refined and slightly hydrogenated soybean oil is suitable, as well as refined cottonseed oil.

As used herein, the term "triglyceride fat" refers to those triglyceride compositions which are solid or plastic above about 25° C. These solid or plastic fats can be derived from plants or animals or can be edible synthetic fats or oils. For example, animal fats such as lard, tallow, oleo oil, oleo stock, oleo stearin and the like which are solid at room temperature can be utilized. Also, triglyceride oils, e.g. unsaturated vegetable oils, can be converted into plastic fats by partial hydrogenation of the unsaturated double bonds of fatty acid constituents of the oil followed by conventional chilling and crystallization techniques or by proper mixture with sufficient triglycerides which are solid at room temperature to form a rigid interlocking crystalline structure which interferes with the free-flowing properties of the liquid oil. See U.S. Pat. No. 3,355,302 to Purves et al, issued Nov. 28, 1967, and U.S. Pat. No. 3,867,556 to Darragh et al, issued Feb. 18, 1975 (herein incorporated by reference), for further examples of solid or plastic fats. Because the solid or plastic fats add an appreciable level of solids to the fat compositions of the present invention, their inclusion can cause adverse effects on the organoleptic properties, in particular waxiness and flavor display, of french fries or other high moisture foods containing these compositions. However, some level of fats is required in the case of par-fried foods to aid in the freezing process. Triglyceride fats and oils useful in the fat compositions of the present invention can include certain triglycerides in which one, two or three of the OH groups of the glycerol molecule have been substituted with acetyl, propionyl, butyryl, caproyl, caprylyl, or capryl radicals, and the remaining OH groups of the glycerol molecule (if any) have been substituted with acyl radicals of saturated or unsaturated fatty acids having from 12 to 24 carbon atoms.

Medium chain triglycerides (MCT's) are also suitable digestible triglyceride oils for inclusion in the fat compositions used in the present invention, especially when the food is to be combined with the fat composition and baked. MCT's are triglycerides in which the glycerol group is completely esterified with medium chain saturated fatty acids. By "medium chain saturated fatty acids" is meant fatty acids selected from the group consisting of $C_{6:0}$ (caproic), $C_{8:0}$ (caprylic), $C_{10:0}$ (capric), and $C_{12:0}$ (lauric) acids. Lauric acid is generally present in amounts of about 2% or less. Preferably the MCT's have the following fatty acid composition: from 0% to about 15% $C_{6:0}$, from about 40% to about 85% $C_{8:0}$, from about 15% to about 55% $C_{10:0}$, and from 0% to about 5% $C_{12:0}$. Most preferably, the MCT fatty acid composition is about 2–4% $C_{6:0}$, about 50–75% $C_{8:0}$, about 25–43% $C_{10:0}$, and about 0.5–2% $C_{12:0}$.

Digestible triglyceride fats and oils used in the fat compositions which in the present invention also include medium and long chain triglycerides (MLCT's). MLCT's are reduced calorie triglycerides selected from MMM, MLM, MML, LLM, LML and LLL triglycerides, and mixtures thereof; wherein M is a medium chain saturated fatty acid as defined above, and wherein L is a long chain saturated fatty acid. By "long chain saturated fatty acid" is meant fatty acid selected from the group consisting of $C_{18}$ to $C_{24}$ saturated fatty acids, and mixtures thereof. By "MML" as used herein, is meant a triglyceride containing a long chain saturated fatty acid residue in the #1 or #3 position (an end position) with two medium chain saturated fatty acid residues in the two remaining positions. (The absorption of long chain saturated fatty acids is generally reduced in the end positions.) Similarly, "MLM" represents a triglyceride with a long chain saturated fatty acid residue in the #2 position (the middle position) and two medium chain saturated fatty acid residues in the #1 and #3 positions. "LLM" represents a triglyceride with a medium chain fatty acid residues in the #1 or #3 position and two long chain fatty acid residues in the remaining two positions, and "LML" represents a triglyceride with a medium chain fatty acid residue in the #2 position and two long chain fatty acid residues in the #1 and #3 positions. By "MMM", as used herein, is meant a triglyceride containing medium chain saturated fatty acid residues at all three positions. Similarly, "LLL" represents a triglyceride containing long chain saturated fatty acid residues at all three positions.

By "stearic MCT", as used herein, is meant a mixture of MLCT's that has been prepared by combining predominantly stearic acid ($C_{18:0}$) and medium chain saturated fatty acids in some manner, for example by random rearrangement of tristearin and medium chain triglycerides. The stearic MCT will contain predominantly stearic acid as the long chain saturated fatty acid. By "behenic MCT" is meant a mixture of MLCT's that have been prepared by combining predominantly behenic acid ($C_{22:0}$) and medium chain saturated fatty acids, for example by random rearrangement of tribehenin and medium chain triglycerides. By "stearic/behenic MCT" is meant a mixture of MLCT's that have been prepared by combining predominantly stearic acid, behenic acid, and medium chain saturated fatty acids. See European patent application 390,410 to Seiden, published Mar. 10, 1990 (herein incorporated by reference), which discloses reduced calorie fats comprising MLCT's useful in the present invention, and especially Examples 1 and 2 for methods for making same. The MLCT's comprise: (1) at least about 85%, preferably at least about 90%, and most preferably at least about 95% combined MLM, MML, LLM and LML triglycerides.

For most fat materials used in the present invention, mono-long chain triglycerides (MLM and MML) are usually preferred over di-long chain triglycerides (LLM and LML), as well as the tri-long chain (LLL) and tri-medium chain (MMM) triglycerides. These preferred MLCT's comprise: (1) at least about 80%, preferably at least about 90% and most preferably at least about 95% combined MLM and MML triglycerides; (2) no more than about 10%, preferably no more than about 5%, and most preferably no more than about 2% combined LLM and LML triglycerides; (3) no more than about 8%, preferably no more than about 4%, and most preferably no more than about 3% MMM triglycerides; and (4) no more than about 2%, preferably no more than about 1%, and most preferably no more than about 0.5% LLL triglycerides.

The fatty acid composition of MLCT's useful in the present invention comprise from about 10 to about 70%, preferably from about 30 to 60%, and most preferably from about 40 to about 50% $C_6$ to $C_{10}$ saturated fatty acids. The $C_8$ and $C_{10}$ saturated fatty acids are most preferred for use in the MLCT's of the present invention. Preferably, the MLCT's contain not more than about 5%, and most preferably no more than about 0.5% $C_6$ saturated fatty acid.

The MLCT's useful in the present invention also comprise from about 30 to about 90%, preferably from about 40 to about 70%, and most preferably from about 40 to about 60% $C_{18}$ to $C_{24}$ saturated fatty acids. For behenic MCT's, the MLCT's comprise from about 20 to about 70%, and preferably from about 25 to about 50% $C_{20}$ to $C_{24}$ long chain saturated fatty acids. Preferred behenic MCT's have fatty acid compositions which comprise no more than about 12%, and most preferably no more than about 9% $C_{20}$ to $C_{24}$ saturated fatty acids other than $C_{22}$ (behenic) saturated fatty acid. For stearic/behenic MCT's, the MLCT's preferably comprise from about 10 to about 30% $C_{18}$ (stearic) saturated fatty acid.

The MLCT's useful in the present invention can contain minor amounts of other fatty acids besides medium and long chain saturated fatty acids. For example, small amounts of $C_{12:0}$, $C_{14:0}$, $C_{16:0}$, $C_{18:1}$, $C_{18:2}$ and $C_{18:3}$ fatty acids can be present. Palmitic acid ($C_{16:0}$) is about 95% absorbed by the body, while the longer chain saturated fatty acids are less absorbed. Therefore, it is preferred that the MLCT's comprise no more than about 10% $C_{16:0}$ fatty acid.

The MLCT's also typically comprise no more than about 6% fatty acids selected from $C_{18:1}$, $C_{18:2}$ and $C_{18:3}$ unsaturated fatty acids, and mixtures thereof, and most preferably no more than about 0.5%. Preferred MLCT's also comprise no more than about 3% fatty acids selected from $C_{12:0}$ (lauric) and $C_{14:0}$ (myristic) fatty acids, and mixtures thereof.

Preferred stearic MCT's useful in the present invention comprise at least about 80% triglycerides having carbon number of from $C_{34}$ to $C_{38}$, from about 40 to about 50% $C_8$ to $C_{10}$ saturated fatty acids and from about 35 to about 50% stearic acid.

The MLCT's useful in the fat composition herein can be prepared by a wide variety of techniques such as:

(a) random arrangement of long chain triglycerides (e.g., tristearin or tribehenin) and medium chain triglycerides;

(b) esterification of glycerol with a blend of the corresponding fatty acids;

(c) transesterification of a blend of medium and long chain fatty acid methyl esters with glycerol; and (d) transesterification of long chain fatty acid glycerol esters (e.g., glyceryl behenate) with medium chain triglycerides.

See Siden; European Patent 390,410; Published Mar. 10, 1990 which discloses the specific preparation of MLCT's and sources of fatty acids used for preparing MLCT's, as well as modification of MLCT's (i.e., fractionation) to satisfy specific product performance requirements.

MCT's and MLCT's are preferred for use in the fat compositions of the present invention from a solvency and caloric density standpoint, whereas conventional triglycerides are preferred from a stability standpoint.

3) Formulation of Fat Compositions Used Herein

The fat compositions used in the present invention can be formulated by combining the nondigestible fat components and the conventional triglyceride fat or oil component in the desired proportions.

Fat compositions wherein the nondigestible fat component contains diversely esterified solid polyol polyesters having mixed ester groups as hereinbefore described will comprise from about 10% to 100% nondigestible fat and from 0 to about 90% triglyceride fat or oil. Preferably such compositions comprise from about 35% to 100% nondigestible fat and from 0 to about 65% triglyceride fat or oil. More preferably such compositions comprise from about 55% to 100% nondigestible fat and from 0 to 45% triglyceride fat or oil, and most preferably such compositions comprise about 55 to about 90% nondigestible fat and from about 10 to about 45% triglyceride fat or oil.

Fat composition wherein the nondigestible fat component contains solid polyol polyester hardstock having ester groups consisting of $C_{14}$ or higher saturated fatty acid radicals will generally comprise from about 10 to 100% nondigestible fat and from 0 to about 90% triglyceride fat or oil. Preferably such compositions comprise from about 35 to about 85% nondigestible fat and from about 15 to about 65% triglyceride fat or oil. More preferably such compositions comprise from about 45 to about 75% nondigestible fat and from about 25 to about 55% triglyceride fat or oil.

Fat compositions wherein the nondigestible fat component contains intermediate melting polyol polyesters will generally comprise from about 55% to about 85% nondigestible fat and from about 15 to about 45% triglyceride fat or oil. Preferably such compositions comprise from about 55 to about 75% nondigestible fat and from about 25 to about 45% triglyceride fat or oil. More preferably such compositions comprise from about 55 to about 65% nondigestible fat and from about 35 to about 45% triglyceride fat or oil.

The fat compositions useful herein can be fortified with vitamins and minerals, particularly the fat-soluble vitamins. The fat-soluble vitamins include vitamin A, vitamin D, and vitamin E. See U.S. Pat. No. 4,034,083 to Mattson (herein incorporated by reference) which discloses fat-soluble vitamins useful in fortifying polyol fatty acid polyesters. Various other ingredients typically present in frying fats can also be included in the compositions used in the present invention. These other ingredients include stabilizers to help protect against oxidative deterioration at high temperatures. Silicone oils, particularly methyl and ethyl silicone gels, are useful for this purpose and also function as anti-foaming agents. Methyl silicones have also proven effective in reducing the rate of oil polymerization during frying. Other additives typically included in frying fat such as minor amounts of optional flavorings, emulsifiers, anti-spattering agents, anti-sticking agents, antioxidants or the like can also be present.

4) Viscosity Characteristics of the Fat Compositions Used Herein

Fluid viscosity of fat materials is a measure of the internal friction between layers of liquid molecules in the fat and directly impacts both the lubriciousness and greasiness impression of fats. In fried food applications, lubriciousness serves to make the food more palatable. The fat compositions used herein thus will generally exceed a certain minimum fluid viscosity to achieve lubriciousness. During mastication of fat compositions having fluid viscosities above this critical minimum, shear forces cause a thinning and dispersal of the fat phase so that a thin film is formed on particles of food. Such a thin film dispersed with the food particles imparts lubriciousness to the masticated food and enhances the overall taste by reducing dryness and transporting fat soluble flavors. However, sometimes the fluid fat phase is not completely dispersed with the food, but rather forms a separate coating on the oral surfaces. This separate coating is perceived in the mouth as greasiness. Greasiness is an undesirable sensory effect in fried foods.

It has been discovered that when fat compositions having fluid viscosities exceeding a critical maximum are cooked onto food, the fluid fat phase tends to form an undesirable separate coating on oral surfaces during mastication of the food. It is therefore important for fat compositions used to coat cooked food to have fluid viscosities which are above a certain minimum to achieve lubriciousness, but below a critical maximum to avoid greasiness. In general, a fluid viscosity of from about 12 to about 105 centipoise for the fat composition gives an acceptable greasiness impression and sensory benefits for french fried potatoes and other high moisture foods containing these fat compositions. Indeed, the greasiness impression of the french fried potatoes of the present invention can be minimized to parity with that of french fried potatoes fried in a 100% triglyceride frying fat by using fat compositions which provide these particular fluid viscosity characteristics.

The viscosity values used to characterize the fat compositions employed in the present invention are to be determined at consumption temperature, i.e., the temperature of the food when it is consumed. The temperature of 140° F. (60° C.) was selected for measuring the hereinbefore specified minimum and maximum fluid viscosity values since it is essentially the temperature at which french fired potatoes and other high moisture fat-coated foods are typically consumed. It has surprisingly been found that the fluid viscosity of the fat compositions at this temperature is correlatable to the greasiness impression left by french fried potatoes and other high moisture foods coated with these compositions, as determined by organoleptic testing.

The maximum fluid viscosity of the fat compositions herein that is suitable for providing reduced greasiness impressions can vary somewhat depending on the fat content of the food when the food is fried in the fat composition. In the case of "high fat" foods (i.e., fat content greater than about 16%), the fluid viscosity of the fat composition should generally be about 70 centipoise or less, preferably 60 centipoise or less, and most preferably 50 centipoise or less. In the case of "medium fat" foods (i.e., fat content of from about 13% to about 16%), the fluid viscosity of the fat composition should be 85 centipoise or less, preferably 75 centipoise or less, and most preferably 65 centipoise or less. In the case of "low fat" foods (i.e., fat content less than about 13%) the fluid viscosity should be about 105 centipoise or less, preferably about 95 centipoise or less, and most preferably about 85 centipoise or less. In general, the fluid viscosity can be increased as the fat content decreases and still provide reduced greasiness impressions in french fried potatoes or other high-moisture foods which are fried in these fat compositions. Thus, for fried foods it is possible to specify a range for the ratio of fluid viscosity of the fat composition to percent total fat in the product. Generally for fried foods this ratio will vary from 2.5 to 25, more preferably from about 2.5 to about 9

There are a number of factors or variables which can affect the fluid viscosity of fat compositions of the type employed in this invention. By adjusting, controlling and selecting these factors or variables it is possible to formulate fat compositions of the foregoing type which will have the requisite fluid viscosity characteristics so as to reduce greasiness of cooked foods prepared therewith.

One feature of fat compositions which can affect their viscosity is the molecular weight of the various fat components which make up such compositions. Although, small differences in molecular weight can have a large impact on the fluid viscosity of a particular fat composition, in general, the fluid viscosity of the fat composition increases as the molecular weight of the materials therein increases. The fat compositions of the present invention comprise a nondigestible fat and optionally a triglyceride fat or oil. Because triglycerides generally have lower molecular weights than nondigestible fats, increasing the proportion of the triglyceride component of the fat composition can lower the fluid viscosity of the present invention. Although it is desirable to increase the proportion of nondigestible fat component to maximize the caloric reduction, this desirability must be balanced against the increase in fluid viscosity, and, hence, the added greasiness impression, that may result from use of greater proportions of the nondigestible fat component. To maximize caloric reduction, the amount of the nondigestible fat component should be maximized to the extent that the desired fluid viscosity of the fat composition can still be maintained. As noted hereinbefore, the fat compositions of the present invention comprise from about 10 to 100% nondigestible fat and from 0 to about 90% triglyceride fat or oil. In lower fat fried foods (i.e., <16%), it is possible to make products with acceptable greasiness impressions using 100% nondigestible fat. In higher fat fried foods (i.e., >16%), the nondigestible fat may have to be blended with triglycerides to achieve the desired fluid viscosity.

Other factors or features which affect and which therefore can be used to adjust the fluid viscosity of the fat compositions used herein relate to the nature of the nondigestible fat composition of such compositions. For example, the fluid viscosity of the fat composition is affected by the level of solids present in the nondigestible fat component. The presence of solids at body temperatures is necessary to to control passive oil loss typically associated with the ingestion of liquid nondigestible oils. However, the presence of high levels of of solids may also lead to rapid crystallization of the fat composition which in turn can lead to an increased fluid viscosity of the fat composition. Such an increase in viscosity may be especially troublesome during cooling of the cooked food. It is thus desirable for the solids levels to be set so that the food experiences minimal crystallization and viscosity increase during cooling from the point of serving at 140° F. Crystallization is determined by the presence of exothermic peaks measured by DSC according to the method described in the Analytical Methods section hereinafter which specifies a particular cooling profile for nondigestible fat materials to be tested for crystallization tendency. Preferably, no crystallization is measured during the first 5 minutes, more preferably no crystallization is measured during the first 10 minutes, and most preferably no crystallization is measured for the full 20 minutes of the cooling profile.

Another factor which can affect the fluid viscosity of the fat composition is the level of saturated fatty acids present in the nondigestible fat component. The frictional interaction and flow properties of the fat are influenced by the intermolecular bonding and packing that occurs between the fatty acid chains. Saturated fatty acid chains are more viscous at room temperature. Thus, fluid viscosity may be reduced by decreasing the level of saturated fatty acids (i.e., increasing the level of unsaturated fatty acids) present in the nondigestible fat. However, reducing the level of saturated fatty acids also reduces the oxidative stability, so the desire for decreased saturated fatty acids to achieve a lower fluid viscosity must be balanced with the needs for oxidative stability and fry-life. The saturated fatty acids typically comprise from about 7 to about 60%, preferably from about 10 to 40%, most preferably from about 15 to about 35% of the ester groups of the solid component of the nondigestible fat component.

C. Preparation of Foods Cooked with Reduced Fat Compositions

The present invention also relates to preparation of french fried potatoes and other high moisture foods cooked with the fat compositions described hereinbefore. As used herein, the term "high moisture food" refers to a food having a moisture content of about 10% or more, preferably about 15% or more, more preferably about 25% or more, and most preferably from about 35% to about 70%, i.e., the food typically has a fairly crisp exterior and a fairly moist or tender interior. This end product moisture content can be achieved before or after treatment with the fat composition.

The fat compositions of the present invention are typically applied to the exterior surface of these high moisture foods (i.e., fat-coated foods), but they may also be incorporated into the interior thereof, or incorporated into the interior of the food, followed by application to the exterior thereof. Thus, the food products of the present invention comprise an edible substrate having incorporated therein from about 3% to about 25%, more preferably from about 10% to 20% of the reduced calorie fat compositions described herein. At least a portion of such a fat composition is coated on the surface of the resulting food product.

The present invention particularly relates to french fries and other high moisture foods that are coated with these reduced calorie fat compositions. As used herein, the term "fat-coated foods" refers to foods prepared by applying the fat compositions of the present invention to all or a portion of the surface thereof. These fat compositions can be applied to an edible substrate by a variety of means including immersion, dipping, soaking, spraying, blowing, pouring, pan coating (e.g., in a revolving pan), tumble coating, brushing, applying with a roller, rolling around in a container of fat composition, falling film methods, enrobing and curtain coating. The fat composition can be heated during application to the food substrate, such as in the case of frying. If desired, the fat compositions of the present invention can be applied to the surface of the food, followed by heating, such as baking in the case of baked foods. The fat composition can also be applied to the surface of a food which already contains fat. Once applied to the surface, the fat composition is typically absorbed to some extent into the interior of the food.

The reduced calorie fat compositions described herein are particularly useful in the preparation of fried foods such as french fried potatoes. The method for frying french fried potatoes and other high moisture foods comprises immersing these foods in a fat composition of the present invention that is heated to the appropriate temperature, for an appropriate period of time. The particular temperatures and times for frying will depend on the particular food that is involved, the moisture content desired in the resulting fried food, the product appearance desired, the texture desired, and the amount of fat absorption desired. In the case of french fried potatoes, cold or frozen uncooked or partially cooked (par-fried) french fried potatoes are deposited in a wire mesh basket which is immersed in a fat composition heated to a temperature of from about 335° to about 400° F. (from about 176.6° to about 190.5° C.) for from about 120 to about 240 seconds. It is believed that cooking the french fried potatoes or other high moisture food at higher temperatures for a shorter period of time may improve the greasiness impression of the french fried potatoes or other high moisture food.

In addition to french fried potatoes, the reduced calorie fat compositions of the present invention are useful in the preparation of other high moisture fried or baked foods such as cottage fries, hash browns, "tater tots", onion rings, chicken, fish, doughnuts, or fried pies (i.e., turnovers). The food substrate may be in whole pieces, or slices, or diced, or shredded, or ground into flour and used by themselves, or with a variety of other food ingredients, e.g., flavors, seasonings, sweeteners (including artificial sweeteners), gels, emulsifiers, carbohydrates, bulking agents, liquid crystals, cheeses, vitamins, fibers, browning agents, etc. The foods may be made from doughs that are extruded or sheeted/cut; pieces may be agglomerated; pieces or whole entities may be coated; pieces or whole entities may be layered between other materials such as crackers, wafers, etc. These may be further fried, dried (including freeze dried), baked, microwaved, etc., into their final food product form.

D. Analytical Test Methods

A number of parameters used to characterize elements of the present invention are to be quantified by particular experimental analytical procedures. Each of these procedures is described in detail as follows:

1. Fluid Viscosity of Fat Composition a) Preparation of the Sample

A 250 to 300 gram sample of the fat composition is placed in a 400 ml beaker and heated to 140° F. (60° C.) using a water bath.

b) Measurement

The fluid viscosity of the fat composition is measured with a Brookfield Model RV ½ viscometer using spindle number 1. The viscometer is set on a shear rate of 10 revolutions per minute. The viscometer spindle is placed in the 140° F. (60° C.) fat composition until the fat composition just covers the spindle immersion line. Sufficient space (i.e., about 1 inch) is left between all sides of the container and the spindle to prevent accidental rubbing. The viscometer spindle is allowed to revolve for several minutes in the fat composition at 10 RPM to ensure uniform mixing and temperatures at 140° F. (60° C.). The shear stress is read from the viscometer dial. The viscosity is calculated by multiplying the measured shear stress by the shear rate factor provided by the manufacturer for a given spindle and shear rate combination. For spindle number 1 at 10 RPM, the shear rate factor is 5.0.

2. Ester Distribution of Sucrose Polyesters

The relative distribution of the individual octa-, hepta-, hexa- and penta- esters, as well as collectively the tetra- through mono- esters, of the sucrose polyesters can be determined using normal-phase high performance liquid chromatography (HPLC). A silica gel-packed column is used in this method to separate the polyester sample into the respective ester groupings noted above. Hexane and methyl-t-butyl ether are used as the mobile phase solvents. The ester groupings are quantitated using a mass detector (i.e. an evaporative light-scattering detector). The detector response is measured and then normalized to 100%. The individual ester groups are expressed as a relative percentage.

3. Solid Fat Content (SFC) of Polyol Polyesters

Before determining the SFC values, a sample of the polyol polyester is heated to a temperature of 140° F. (60° C.) or higher for at least 30 minutes or until the sample is completely melted. The melted sample is then tempered as follows: at 80° F. (26.7° C.) for 15 minutes; at 32° F. (0° C.) for 15 minutes; at 80° F. (26.7° C.) for 30 minutes; at 32° F. (0° C.) for 15 minutes. After tempering, the SFC values of the sample at temperatures of 50° F. (10° C.), 70° F. (21.1° C.), 80° F. (26.7° C.), 92° F. (33.3° C.), and 98.6° F. (37.20 C.) are determined by pulsed nuclear magnetic resonance (PNMR) after equilibration for 30 minutes at each temperature. The slope of the SFC profile in % solids/°F. is calculated by subtracting the SFC value at 70° F. from the SFC value at 98.6° F. and then dividing by 28.6. The method for determining SFC values by PNMR is described in *J. Amer. Oil Chem. Soc.*, Vol. 55 (1978), pp. 328–31 (herein incorporated by reference, and A.O.C.A. Official Method Cd. 16-81, *Official Methods and Recommended Practices of The American Oil Chemists Society*, 3rd. Ed., 1987, (herein incorporated by reference).

4. Complete Melting Point of Solid Polyol Polyesters by Differential Scanning Calorimetry (DSC)

The complete melting point of the solid polyol polyesters can be determined by DSC as follows:

Equipment

Perking-Elmer 7 Series Thermal Analysis System, Model DSC7, manufactured by Perkin-Elmer, Norwalk, Conn.

Procedure a. Sample of solid polyol polyesters is heated to at least 10° C. above the complete melt point and mixed thoroughly.

b. 10± 2 mg of sample is weighed into sample pan.

c. A scan is performed from about 10° C. above the temperature at which all visible solids are gone to −60° C. at 5° C. per minute.

d. The temperature of the sample is maintained at −60° C. for 3 minutes and scanned from −60° C. to the original starting temperature at 5° C. per minute (i.e., from about 10° C. above the temperature at which all visible solids are gone).

e. The complete melt point is the temperature at the intersection of the base line (i.e. specific heat line) with the line tangent to the trailing edge of the endothermic peak.

5. Intermediate Melting Polyol Polyester Viscosity Measurement a. Sample Preparation A sample of the polyesters is melted in a hot water both at greater than 190° F. (87.8° C.). The melted sample is thoroughly mixed and 10 grams of melted sample is weighed into a vial. The vial is covered and then heated in a hot water bath to greater than 190° F. (87.8° C.). The sample is then removed from the hot water bath and allowed to recrystallize at 100° F. (37.8° C.) in a constant temperature room. After a 24 hour time period has elapsed, the sample is taken to the viscometer and the viscosity is measured.

b. Ferranti-Shirley Viscometer Operation Procedure

A Ferranti-Shirley viscometer equipped with a 600 g. torque spring is used for the viscosity measurement. A cone is put into place, and the viscometer temperature is adjusted to 100° F. (37.8° C.). The chart recorder is calibrated, and the gap between the cone and plate is set. The cone speed is checked, and the cone and plate temperatures are equilibrated to 100° F. (37.8° C.). The panel controls are set. Sufficient sample is placed between the plate and the cone so that the gap is completely filled. The temperature is allowed to stabilize at 100° F. (37.8° C.) for about 30 seconds. The test is started by selecting the rpm for 10 seconds$^{-1}$ shear rate and record on the strip chart recorder. The shear stress is recorded at 10 minutes after the point at which the shear stress reaches the maximum value. Viscosity (pose)=shear stress (dynes/cm$^2$) divided by shear rate (second$^{-1}$).

6. Polyol Polyester Liquid/Solid Stability Measurement

A sample of the polyesters is heated in a hot water bath at greater than 190° F. (87.8° C.) until it completely melts and is then thoroughly mixed. The sample is then poured to capacity into 4.4 ml. centrifuge tubes at 100° F. (37.8° C.). The sample is then allowed to recrystallize for 24 hours at 100° F. (37.8° C.) in a constant temperature room. The sample is then centrifuged at 60,000 rpm in a Beckman Model L870M centrifuge having a Beckman Model SW60 head for one hour at 100° F. (37.8° C.). The maximum force on the sample (i.e. at the bottom of the tube) is 485,000 g's. The percent liquid separated is then measured by comparing the relative heights of the liquid and solid phases. The height of the liquid phase is measured using a metric ruler and recorded in mm. The height of the sample is measured in the same way and recorded in mm. 2 mm (correction for curvature in the tube bottom) is added to the straight wall height to obtain "total height". Liquid/solid stability (%)=100×(total sample height− liquid oil height)/total sample height.

7. Polyol Polyester Fatty Acid Composition and Trans Fatty Acids

The fatty acid composition (FAC) of the polyesters is determined by gas chromatography, using a Hewlett-Packard Model S712A gas chromatograph equipped with a thermal conductivity detector and a Hewlett-Packard Model 7671A automatic sampler. The chromatographic method used is described in *Official Methods and Recommended Practices of the American Oil Chemists Society*, 3rd Ed., 1984, Procedure Ce 1–62.

The percentage of trans fatty acids in the polyester sample is determined by infrared spectrophotometry (IR). The IR method used is described in Madison et al. "Accurate Determination of trans Isomers in Shortenings and Edible Oils by Infrared Spectrophotometry." *J. Am. Oil Chem.*, Vol. 59, No. 4 (1982), pp. 178–81. The trans value obtained by IR, together with the total number of double bonds based on the FAC of the polyester sample, is used to calculate the percentage of trans double bonds.

8. Crystallization of Solids in Fried Foods under Ambient Conditions Using DSC

A Differential Scanning Calorimeter (Perkin-Elmer Series 7 Thermal Analysis System) is programmed to simulate the ambient cooling of a plate containing about ½ pound of french fried potatoes or other end-use product which has just removed from the fryer. The cooling profile lasts 20 minutes.

5–7 milligrams of a sample of a nondigestible fat material is heated to about 195° F. (90.5° C.) in the DSC. The sample is then cooled at ar ate of 12.4° F. (6.9° C.) per minute for 4 minutes. The sample is then cooled at a rate of 5.2° F. (2.9° C.) per minute for 8 minutes. Lastly, the sample is cooled at a rate of 1.6° F. (0.9° C.) per minute for 12 minutes. Heat flow peaks measured below the baseline are a measure of crystallization.

E. Specific Examples

Several reduced calorie fat compositions are prepared and then used in the following Examples 1–4 to prepare french fried potatoes. All of these fat compositions contain a nondigestible fat component. All but one of these fat compositions also contain a "conventional" triglyceride component. The nondigestible fat component of these compositions comprises either a) a blend of a liquid and solid sucrose polyesters (SPEs) or b) an intermediate melting fat (IMF) sucrose polyester (SPE).

The components of the nondigestible fat, optionally added to refined, bleached and deodorized soybean oil or medium chain triglycerides, are blended together and heated until all the solids are dissolved to provide the fat compositions as described in Table I.

TABLE I

| FAT COMPOSITION | COMPONENT | |
| --- | --- | --- |
| A | Liquid SPE I | 95.0 |
|   | Solid SPE I | 5.0 |
| B | Liquid SPE I | 85.5 |
|   | Solid SPE I | 4.5 |
|   | Soybean Oil | 10.0 |
| C | Liquid SPE I | 76.0 |
|   | Solid SPE I | 4.0 |
|   | Medium Chain Triglyceride | 20.0 |
| D | Liquid SPE I | 66.5 |
|   | Solid SPE I | 3.5 |
|   | Soybean Oil | 30.0 |
| E | Liquid SPE II | 85.5 |
|   | Solid SPE I | 4.5 |
|   | Medium Chain Triglyceride | 10.0 |

TABLE I-continued

| FAT COMPOSITION | COMPONENT | |
|---|---|---|
| F | Liquid SPE I | 75.0 |
|   | Soybean Oil | 25.0 |
| G | IMF SPE I | 55.0 |
|   | Soybean Oil | 45.0 |

The intermediate melting fat sucrose polyester (IMF SPE), solid sucrose polyester (solid SPE) and liquid sucrose polyesters (liquid SPE) used to make these fat compositions have the attributes set forth in the following Table II.

TABLE II

|   | IMF SPE I | Solid SPE I | Liquid SPE I | Liquid SPE II |
|---|---|---|---|---|
| FATTY ACID COMPOSITION | | | | |
| % C8 | 0.0 | 0.0 | 0.0 | 100.0 |
| % C12 | 0.0 | 0.0 | 0.0 | 0.0 |
| % C14 | 0.0 | 0.0 | 0.4 | 0.0 |
| % C16 | 9.5 | 2.9 | 21.3 | 0.0 |
| % C18 | 54.7 | 1.0 | 4.4 | 0.0 |
| % C18-1 | 19.9 | 4.4 | 32.1 | 0.0 |
| % C18-2 | 13.6 | 4.5 | 40.8 | 0.0 |
| % C18-3 | 1.0 | 0.0 | 0.2 | 0.0 |
| % C20 | 0.7 | 2.0 | 0.4 | 0.0 |
| % C22 | 0.0 | 83.4 | 0.1 | 0.0 |
| % C24 | 0.0 | 1.8 | 0.0 | 0.0 |
| % Other | 0.6 | 0.0 | 0.3 | 0.0 |
| ESTER DISTRIBUTION | | | | |
| % OCTA | 92.9 | 74.0 | 76.0 | 100.0 |
| % HEPTA | 7.1 | 25.3 | 23.2 | <0.1 |
| % HEXA | <0.1 | 0.3 | 0.4 | <0.1 |
| % PENTA | <0.1 | 0.4 | 0.4 | <0.1 |
| % LOWER | <0.1 | <0.1 | <0.1 | <0.1 |

EXAMPLE 1

Russett Burbank potatoes at about a 20% potato solids content are cut into ¼"×3⅜" potato strips to make shoestring style french fried potatoes. The potato strips are blanched in hot water (190° F.) for about 10 minutes then allowed to equilibrate for about 10 minutes under ambient conditions. The potato strips are fried in each of two fat compositions to doneness using a food service type kettle ratio of fryer at a fryer oil mass to potato strip mass of about 15:1. Fat compositions and characteristics of the fried products are set forth in Table III:

TABLE III

| FAT COMPOSITION | FRYING TEMPERATURE | FRYING TIME | Fluid Viscosity at 140° F. (centipoise) | % FAT | % MOISTURE |
|---|---|---|---|---|---|
| C | 350° F. | 6.0 min. | 45 | 15.2 | 45.08 |
| D | 350° F. | 6.0 min. | 53 | 19.9 | 35.44 |

Both of these french fry samples are not unacceptably greasy tasting even though they contain relatively high levels of nondigestible fat materials.

EXAMPLE 2

Russett Burbank potatoes at about 20% potato solids content are cut into ¼"×3⅜" potato strips to make shoestring style french fried potatoes. The potato strips are blanched in 140° F. water for 5 minutes. The blanched potato strips are allowed to equilibrate at ambient conditions for 5 minutes followed by drying in an oven set at 175° F. and 90% relative humidity for 10 minutes.

The dried potato strips are then fried in the fat compositions of Table IV for 90 seconds at 375° F. followed by rapid freezing to make frozen par fries. The par fries are finished fried in the same fat composition at about 15:1 loading ratio of frying fat to par fry mass.

TABLE IV

| FAT COMPOSITION | FINISHED FRYING TEMPERATURE | FINISHED FRYING TIME | Fluid Viscosity at 140° F. (centipoise) | % FAT | % MOISTURE |
|---|---|---|---|---|---|
| F | 400° F. | 4.0 min. | 65 | 14.4 | 33.1 |
| G | 350° F. | 3.7 min. | 48 | 16.2 | 41.0 |

Both of these french fry samples are not unacceptably greasy tasting even through they contain relatively high levels of nondigestible fat materials.

EXAMPLE 3

Russett Burbank potatoes at about 20% potato solids content are cut into 1"×4" wedges to made steak fry style french fried potatoes. The potato wedges are blanched for 15 minutes in 190° F. water and allowed to equilibrate for 10 minutes at ambient conditions. The potato wedges are then par fried in a frying pan containing about ½"-1" depth of the fat compositions described in Table V.

TABLE V

| FAT COMPOSITION | FRYING TEMPERATURE | FRYING TIME | Fluid Viscosity at 140° F. (centipoise) | % FAT | % MOISTURE |
|---|---|---|---|---|---|
| A | 350° F. | 7.0 min. | 95 | 11.2 | 71.8 |
| B | 350° F. | 7.0 min. | 78 | 3.2 | 71.7 |
| E | 350° F. | 15.0 min. | 58 | 7.4 | 74.7 |

All three of these french fry samples are not unacceptably greasy tasting even though they contain relatively high levels of nondigestible fat materials.

EXAMPLE 4

Russett Burbank potatoes of about 20% potato solids content are cut into ¼"×3½" potato strips to make shoestring type french fried potatoes. The potato strips are then blanched in 165° F. water for 10 minutes. The blanched potato strips were then twice par fried by first frying at 360° F. for 50 seconds followed by freezing and then frying at 360° F. for 180 seconds. The twice par fried potato's are then frozen. The final french fried potatoes are prepared by baking in a convection oven at 425° F. for 4½ minutes. Results are set forth in Table VI.

TABLE VI

| FAT COMPOSITION | Fluid Viscosity at 140° F. | % FAT | % MOISTURE |
| --- | --- | --- | --- |
| A | 95 | 18.9 | 29.3 |

Such french fries are not unacceptably greasy tasting even though they contain relatively high levels of nondigestible fat materials.

What is claimed is:

1. A high moisture, cooked food product of reduced greasiness, which product comprises an edible substrate and from about 3 to about 25% of a reduced calorie fat composition, at least a portion of which fat composition is coated on the surface of said food product; wherein
   A) said reduced calorie fat composition comprises:
      i) from about 10 to 100% of a nondigestible fat component comprising:
         (a) a liquid nondigestible oil having a complete melting point below about 37° C.; and
         (b) a nondigestible solid polyol fatty acid polyester which has a complete melting point above about 37° C. and which is present in an amount sufficient to control passive oil loss;
         said nondigestible fat component having a Solid Fat Content profile slope between 70° F. and 98.6° F. of from 0 to about −0.75% solids/°F.; and
      ii) from 0 to about 90% of a triglyceride fat or oil; and
   B) said reduced calorie fat composition is formulated to have a fluid viscosity of from about 12 to about 105 centipoise at 60° C.

2. A food product according to claim 1 wherein
   A. the reduced calorie fat composition comprises from about 10% to about 20% of the food product;
   B. the reduced calorie fat composition has a fluid viscosity of about 85 centipoise or less;
   C. the ratio of fluid viscosity of said fat composition to percent fat in said product ranges from about 2.5 to about 25; and
   D. the nondigestible fat component exhibits substantially no crystallization during the first 5 minutes of cooling from a temperature of 90.5° C.

3. A food product according to claim 2 wherein the nondigestible fat component comprises:
   A) from about 80 to about 99% of the nondigestible fat component of a liquid polyol fatty acid polyester; and
   B) from about 1 to about 20% of the nondigestible fat component of a solid polyol fatty acid polyester having the ester groups which comprise a combination of:
      (1) $C_{12}$ or higher unsaturated fatty acid radicals, $C_4$–$C_{12}$ saturated fatty acid radicals or mixtures thereof, and
      (2) $C_{20}$ or higher saturated fatty acid radicals which comprise at least about 15% of the total ester-forming radicals in the polyol polyester,
   wherein the molar ratio of (1):(2) radicals is from about 1:15 to about 2:1.

4. A food product according to claim 3 wherein
   A) the reduced calorie fat composition comprises from about 35 to about 100% nondigestible fat and from about 0 to about 65% triglyceride fat or oil; and
   B) the polyol used to form the polyol fatty acid polyester component is sucrose.

5. A food product according to claim 2 wherein the nondigestible fat component comprises:
   A) from about from about 60 to about 90% of the nondigestible fat components of an oil; and
   B) from about 10 to about 40% of the nondigestible fat component of a solid polyol fatty acid polyester having ester groups comprising $C_{14}$–$C_{18}$ saturated fatty acid radicals.

6. A food product according to claim 5 wherein
   A) the reduced calorie fat composition comprises from about 35 to about 85% of a nondigestible fat and from about 15% to about 65% of a triglyceride fat or oil; and
   B) the polyol used to form the polyol fatty acid polyester components is sucrose.

7. A food product according to claim 6 wherein the edible substrate comprises potato material and the food product is fried.

8. A high moisture, cooked food product of reduced greasiness, which product comprises an edible substrate and from about 3 to about 25% of a reduced calorie fat composition, at least a portion of which fat composition is coated on the surface of said food product; wherein
   A. the reduced calorie fat composition comprises:
      i) from about 55 to 85% of a nondigestible polyol fatty acid polyester component comprising polyols selected from the group consisting of sugars and sugar alcohols having from 4 to 8 hydroxyl groups, which polyol contains fatty acid ester groups having from 4 to 24 carbon atoms, said polyol polyester component further having
         a) a viscosity at 37.8° C. of from about 5 to about 120 poise at a shear rate of 10 seconds$^{-1}$;
         b) a liquid/solid stability at 37.8° C. of at least about 30%; and
         c) a Solid Fat Content at 37° C. of about 25% or less; and
      ii) from 15 to about 45% of a triglyceride fat or oil;
   B. said reduced calorie fat composition is formulated to have a fluid viscosity of from about 12 to about 105 centipoise at 60° C.; and
   C. the ratio of fluid viscosity of said fat composition to percent fat in said product ranges from about 2.5 to about 25.

9. A food product according to claim 8 wherein the polyol fatty acid polyester component is a sucrose fatty acid polyester having a viscosity of from about 10 to about 75 poise and a liquid/solid stability of at least about 50%.

10. A food product according to claim 9 wherein the sucrose fatty acid polyester component comprises at least about 85% esters selected from the group consisting of octaesters, heptaesters, hexaesters and mixtures thereof, at least about 70% of the esters being octaesters.

11. A food product according to claim 10 wherein the edible substrate comprises potato material and the food product is fried.

12. A method for preparing a high moisture, cooked food product of reduced greasiness, which method comprises incorporating into an edible substrate from about 3% to about 25% of a reduced calorie fat composition, at least a portion of which fat composition remains coated on the surface of said food product after cooking; wherein
A) said reduced calorie fat composition comprises:
   i) from about 10 to 100% of a nondigestible fat component comprising:
      a) a liquid nondigestible oil having a complete melting point below about 37° C.; and
      b) a nondigestible solid polyol fatty acid polyester having a complete melting point above about 37° C. to which is present in amount sufficient to control passive oil loss;
      said nondigestible fat component having a Solid Fat Content profile slope between 70° F. and 98.6° F. of from 0 to about −0.75% solids/°F.; and
   ii) from 0 to about 90% of a triglyceride fat or oil; and
B) said reduced calorie fat composition is formulated to have a fluid viscosity of from about 12 to about 105 centipoise at 60° F.

13. A method according to claim 12 wherein
A. the reduced calorie fat composition comprises from about 10% to about 20% of the food product;
B. the reduce calorie fat composition has a fluid viscosity of 85 or less;
C. the ratio of fluid viscosity of said fat composition to percent fat in said product ranges from about 2.5 to about 25;
D. the nondigestible fat component exhibits substantially no crystallization during the first 5 minutes of cooling from a temperature of 90.5° C.

14. A method according to claim 13 wherein the nondigestible fat component comprises:
A) from about 80 to about 99% of the nondigestible fat component of a liquid polyol fatty acid polyester; and
B) from about 1 to about 20% of the nondigestible fat of a solid polyol fatty acid polyesters having the ester groups which comprise a combination of:
   (1) $C_{12}$ or higher unsaturated fatty acid radicals, $C_4$-$C_{12}$ saturated fatty acid radicals or mixtures thereof, and
   (2) $C_{20}$ or higher saturated fatty acid radicals which comprise at least 15% of the total ester-forming radials in the polyol polyester,
wherein the molar ratio of (1):(2) radicals ranges from about 1:15 to about 2:1.

15. A method according to claim 14 wherein
A. the reduced calorie fat composition comprises from about 35 to 100% nondigestible fat component and from 0 to about 65% triglyceride fat or oil; and
B. the polyol used to form the polyol fatty acid polyester component is sucrose.

16. A method according to claim 13 wherein the nondigestible fat comprises:
A) from about 60 to about 90% liquid nondigestible oil having a complete melting point below about 37° C.; and
B) from about 10 to about 40% solid polyol fatty acid polyesters wherein the ester groups consist essentially of $C_{14}$-$C_{18}$ saturated fatty acid radicals.

17. A method according to claim 16 wherein
A. the reduced calorie fat composition comprises from about 35 to about 85% nondigestible fat and from about 15 to about 65% triglyceride fat or oil; and
B. the polyol used to form the polyol fatty acid polyester component is sucrose.

18. A method according to claim 17 wherein the edible substrate comprises potato material and the food product is fried.

19. A method for preparing a high moisture, cooked food product of reduced greasiness, which method comprises incorporating into an edible substrate from about 3 to about 25% of a reduced calorie fat composition, at least a portion of which fat composition remains coated on the surface of said food product after cooking; wherein
A) said reduced calorie composition comprises:
   i) from about 55 to about 85% of a nondigestible polyol fatty acid polyester compound comprising a polyol selected from the group consisting of sugars and sugar alcohols having from 4 to 8 hydroxyl groups, and fatty acid ester groups having from 4 to 24 carbon atoms, said polyol polyester component further having
      a) a viscosity at 37.8° C. from about 5 to about 120 poise at a shear rate of 10 seconds$^{-1}$;
      b) a liquid/solid stability at 37.8° C. of at least about 30%; and
      c) a Solid Fat Content profile slope of about 25% solid/°F. or less at 37° C.; and
   ii) from about 15 to about 45% triglycerides;
B) said reduced calorie fat composition is formulated to have a fluid viscosity of from about 12 to about 105 centipoise; and
C) the ratio of fluid viscosity of said composition to percent fat present in said product ranges from about 2.5 to about 25.

20. A method according to claim 18 wherein the polyol polyester component is a sucrose fatty acid polyester having a viscosity of from about 10 to about 75 poise and a liquid/solid stability of at least about 50%.

21. The method according to claim 19 wherein the sucrose fatty acid polyesters comprise at least about 85% esters selected from the group consisting of octaesters, heptaesters, hexaesters and mixtures thereof, at least about 70% of the esters being octaesters.

22. A method according to claim 21 wherein the edible substrate comprises potato material and the food product is fried.

* * * * *